(12) United States Patent
Ahtikari

(10) Patent No.: US 12,741,560 B2
(45) Date of Patent: Sep. 22, 2026

(54) METHOD TO CONFIGURE ELECTRIC VEHICLE CHARGING STATION TO ENABLE PLUG AND CHARGE FUNCTION

(71) Applicant: LIIKENNEVIRTA OY / VIRTA LTD, Helsinki (FI)

(72) Inventor: Jussi Ahtikari, Helsinki (FI)

(73) Assignee: LIIKENNEVIRTA OY / VIRTA LTD, Helsinki (FI)

( * ) Notice: Subject to any disclaimer, the term of this patent is extended or adjusted under 35 U.S.C. 154(b) by 24 days.

(21) Appl. No.: 18/858,035

(22) PCT Filed: Apr. 6, 2023

(86) PCT No.: PCT/FI2023/050193
§ 371 (c)(1),
(2) Date: Oct. 18, 2024

(87) PCT Pub. No.: WO2023/203279
PCT Pub. Date: Oct. 26, 2023

(65) Prior Publication Data

US 2025/0276602 A1 Sep. 4, 2025

(30) Foreign Application Priority Data

Apr. 22, 2022 (FI) ..................................... 20225336

(51) Int. Cl.

| | |
|---|---|
| ***B60L 53/66*** | (2019.01) |
| ***B60L 53/65*** | (2019.01) |
| ***B60L 53/67*** | (2019.01) |

(52) U.S. Cl.
CPC ............... *B60L 53/65* (2019.02); *B60L 53/67* (2019.02); *B60L 2250/20* (2013.01)

(58) Field of Classification Search
CPC ...... B60L 53/67; B60L 53/65; B60L 2250/20; Y04S 30/12; Y02T 10/70; Y02T 90/12;
(Continued)

(56) References Cited

U.S. PATENT DOCUMENTS

| | | | | |
|---|---|---|---|---|
| 2,019,016 A * | 10/1935 | James | ..................... | G07F 13/10 141/183 |
| 11,685,287 B2 * | 6/2023 | Ahtikari | ................. | G06Q 50/40 700/286 |

(Continued)

FOREIGN PATENT DOCUMENTS

| | | | | |
|---|---|---|---|---|
| CN | 105743169 B * | 4/2018 | ............ | B60L 53/665 |
| CN | 113199958 A * | 8/2021 | .............. | B60L 53/65 |

(Continued)

OTHER PUBLICATIONS

Mayfield, David, and Clean Fuels Ohio. "Siting electric vehicle charging stations." Editor Carlotta Collette (2012). (Year: 2012).*
(Continued)

*Primary Examiner* — Cuong H Nguyen
(74) *Attorney, Agent, or Firm* — Maschoff Brennan

(57) ABSTRACT

Various example embodiments relate to configuration of electric vehicle charging stations and charging station management systems such that authorization without user interaction may be enabled in response to a plugged-in electric
(Continued)

vehicle. A computing device, a method, a computer-readable medium and a computer program are disclosed.

14 Claims, 5 Drawing Sheets

(58) Field of Classification Search
CPC .... Y02T 90/16; H04W 12/069; H04W 12/06; H04W 12/065
See application file for complete search history.

(56) References Cited

U.S. PATENT DOCUMENTS

| | | | | |
|---|---|---|---|---|
| 11,820,326 | B2 * | 11/2023 | Drayna | H04W 4/80 |
| 2010/0211643 | A1 * | 8/2010 | Lowenthal | B60L 53/14 709/206 |
| 2010/0315197 | A1 | 12/2010 | Solomon et al. | |
| 2015/0224888 | A1 | 8/2015 | Wild et al. | |
| 2021/0036522 | A1 * | 2/2021 | Solomon | G06F 21/31 |
| 2022/0069602 | A1 * | 3/2022 | Shin | H02J 7/47 |
| 2023/0057752 | A1 | 2/2023 | Shin | |

FOREIGN PATENT DOCUMENTS

| | | | | |
|---|---|---|---|---|
| EP | 2366580 | B1 * | 5/2020 | B60L 53/64 |
| EP | 3 962 017 | A1 | 3/2022 | |
| JP | 2011166283 | A | 8/2011 | |
| JP | 2013198230 | A | 9/2013 | |
| JP | 2022061185 | A | 4/2022 | |
| TW | 1757024 | B * | 3/2022 | B60L 53/65 |
| WO | 2011/094627 | A1 | 8/2011 | |
| WO | 2020/115357 | A1 | 6/2020 | |
| WO | 2021/158021 | A1 | 8/2021 | |

OTHER PUBLICATIONS

Jamil, Faisal, et al. "PetroBlock: A blockchain-based payment mechanism for fueling smart vehicles." Applied Sciences 11.7 (2021):3055. (Year: 2021).*

Brooks, Cameron, Peter Cappers, and Andrew Satchwell. "Expanding the Scope of Commercial Opportunities for Investor-Owned Electric Utilities." (2021).*

Abreu, Luís Rafael Roberto. Field Lab—Technology Strategy with Mercedes-Benz: Analysis of Mercedes-Benz-s Readiness for the Online Sales Business Model. MS thesis. Universidade NOVA de Lisboa (Portugal), 2021.*

Mcllwaine, Neil. A market analysis of customer-connected mass energy storage. Diss. Queen's University Belfast, 2022. (Year: 2022).*

Pacyniak, Gabriel, Daren Zigich, and Jacqueline Waite. "Grid Modernization Baseline Report of New Mexico's Electricity Sector." UNM School of Law Research Paper 2020-13 (2022). (Year: 2022).*

Pacyniak, Gabriel, Daren Zigich, and Jacqueline Waite. "Grid Modernization Baseline Report of New Mexico's Electricity Sector." UNM School of Law Research Paper 2020-13 (Year: 2022).*

Dr. Marc Mültin (V2G Clarity) & Christian Hahn (Hubject) Secure and User-Friendly EV Charging—A Comparison of Autocharge and ISO 15118's Plug & Charge, Berlin: Clarity & Hubject , pp. 1-14 (Jun. 12, 2019).

Finnish Search Report dated Oct. 20, 2022 as received in Application No. 20225336.

JP Notice of Reasons for Rejection dated Nov. 4, 2025 in application No. 2024-559051.

* cited by examiner

METHOD TO CONFIGURE ELECTRIC VEHICLE CHARGING STATION TO ENABLE PLUG AND CHARGE FUNCTION

TECHNICAL FIELD

The present application generally relates to electric vehicle charging stations. In particular, some example embodiments of the present application relate to configuration of a plug & charge function at an electric vehicle charging station.

BACKGROUND

When electric vehicle (EV) drivers want to start charging on a charging station, they may be authorized based on an identification provided by the driver at the charging station.

It would be beneficial to improve user experience for start of charging.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable configuration of a charging station and a charging station management system to enable automatic authorization. The automatic authorization may enable a user to start charging at the charging station such that the user only needs to plug in a charging cable of their electric vehicle. The configuration may be implemented between the charging station and the charging station management system such that no data from the charging cable or vehicle is required. Further, interaction required from the user may be minimized.

According to a first aspect a computer-implemented method is provided. The method may comprise receiving a first message for authorization from an electric vehicle charging station, the message comprising an indicator for an automatic authorization function which is initiated by detection of an electric vehicle being connected to the electric vehicle charging station and an identifier of the electric vehicle charging station; rejecting authorization based on the identifier of the charging station when the identifier is not associated to an authorized user; receiving a second message for authorization from the electric vehicle charging station, the message comprising an identifier of an user; accepting the authorization after determining that the identifier of the user is associated to an authorized user; determining if any message for authorization comprising the indicator was rejected within a predetermined interval from the accepted authorization; linking the identifier of the charging station with the authorized user associated with the identifier of the user when the message comprising the indicator was received within the predetermined interval; and accepting authorizations based on the linked authorized user for any subsequent messages for authorization comprising the identifier of the charging station with the indicator.

In an embodiment, the predetermined interval has a value between ten seconds and ten minutes.

In an embodiment, in addition or alternatively, the computer-implemented method may further comprise sending a request to determine if the user wants to enable the automatic authorization function at the electric vehicle charging station in response to a connected electric vehicle being detected; and linking the identifier of the charging station with the authorized user after receiving an approval from the user.

In an embodiment, in addition or alternatively, the computer-implemented method may further comprise determining a group of charging stations the electric vehicle charging station belongs to; determining if the automatic authorization is allowed for the charging stations of the group; and linking the identifier of the charging station with the authorized user if the automatic authorization is allowed for the group.

In an embodiment, in addition or alternatively, wherein the request is sent to the user in response to determining that the automatic authorization is allowed for the group only after an approval is received from the user.

In an embodiment, in addition or alternatively, the computer-implemented method may further comprise receiving a start-up notification from the electric vehicle charging station; requesting configuration settings of the electric vehicle charging station in response to the start-up notification; determining if the automatic authorization function comprising a use of the identity of the electric vehicle charging station with the indicator are set to enabled based on the configuration settings; determining if the automatic authorization for the group is allowed to be enabled at startup when automatic authorization is disabled; and sending a configuration message to the electric vehicle charging station to enable the automatic authorization function and setting the identifier of the charging station with the indicator to be used when the automatic authorization is allowed.

In an embodiment, in addition or alternatively, the computer-implemented method may further comprise sending a request to the user to determine if the electric vehicle charging station is a personal electric vehicle charging station of the user; and upon receiving a verification from the user, removing the electric vehicle charging station from the group.

According to a second aspect, a computing device is provided. The computing device comprises at least one processor and at least one memory, the at least one memory including program code configured to, when executed by the at least one processor, cause the computing device to receive a first message for authorization from an electric vehicle charging station, the message comprising an indicator for an automatic authorization function which is initiated by detection of an electric vehicle being connected to the electric vehicle charging station and an identifier of the electric vehicle charging station; reject authorization based on the identifier of the charging station when the identifier is not associated to an authorized user; receive a second message for authorization from the electric vehicle charging station, the message comprising an identifier of an user; accept the authorization after determining that the identifier of the user is associated to an authorized user; determine if any message for authorization comprising the indicator was rejected within a predetermined interval from the accepted authorization; link the identifier of the charging station with the authorized user associated with the identifier of the user when the message comprising the indicator was received within the predetermined interval; and accept authorizations based on the linked authorized user for any subsequent messages for authorization comprising the identifier of the charging station with the indicator.

In an embodiment, the at least one memory including program code is further configured to, when executed by the at least one processor, cause the computing device to send a request to determine if the user wants to enable the automatic authorization function at the electric vehicle charging station in response to a connected electric vehicle being detected; and link the identifier of the charging station with the authorized user after receiving an approval from the user.

In an embodiment, in addition or alternatively, the at least one memory including program code is further configured to, when executed by the at least one processor, cause the computing device to determine a group of charging stations the electric vehicle charging station belongs to; determining if the automatic authorization is allowed for the charging stations of the group; and link the identifier of the charging station with the authorized user if the automatic authorization is allowed for the group.

In an embodiment, in addition or alternatively, the at least one memory including program code is further configured to, when executed by the at least one processor, cause the computing device to send a request to determine if the electric vehicle charging station is a personal electric vehicle charging station of the user, the request comprising location information of the electric vehicle charging station to be verified by the user; and upon reception of a verification from the user, remove the electric vehicle charging station from the group.

In an embodiment, in addition or alternatively, the at least one memory including program code is further con-figured to, when executed by the at least one processor, cause the computing device to determine if the automatic authorization is allowed in the group only after an approval is received from the user; and send the request to determine if the user wants to enable the automatic authorization function at the electric vehicle charging station.

In an embodiment, in addition or alternatively, the at least one memory including program code is further configured to, when executed by the at least one processor, cause the computing device to receive a start-up notification from the electric vehicle charging station; request configuration settings of the electric vehicle charging station in response to the start-up notification; determine if the automatic authorization function and a use of the first identity with the indicator are set to enabled based on the configuration setting; determine if configuration of the automatic authorization settings for the group is allowed to be enabled at start-up when automatic authorization settings are not enabled; and send a configuration message to the electric vehicle charging station to enable the automatic authorization function and setting the first identifier with the indicator for the charging station to be used when the configuration is allowed.

According to a third aspect, there is provided a computer-readable medium comprising program instructions which, when executed on a computing device, cause the computing device to perform the method of the first aspect.

According to a fourth aspect, there is provided a computer program comprising instructions which, when executed by a computing device cause the computing device to carry out the method of the first aspect.

Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like references are used to designate like parts in the accompanying drawings.

DETAILED DESCRIPTION

Figure 1:
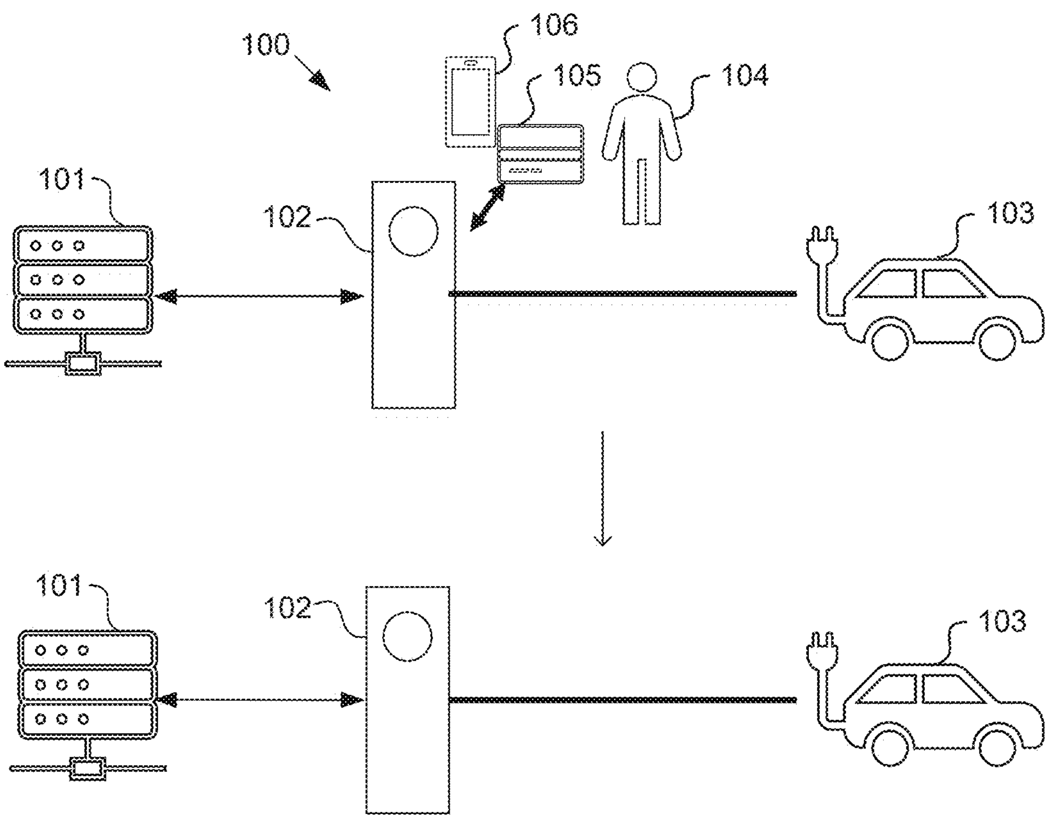
FIG. 1 illustrates from a user point of view a process to configure and enable plug & charge at a charging station according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

Electric vehicle charging stations are used to charge electric vehicles (EVs). Charging stations may be connected to a charging station management system (CSMS), for example, with an OCPP (open charge point protocol). EV drivers own electric vehicles and charge their EVs on charging stations.

Authorization at the charging stations may be done with a RFID-card or a mobile application. However, it may be annoying for the EV driver to initiate the authorization each time they arrive at the charging station for charging. Further, the RFID-card or mobile phone may not always be conveniently at hand, and they tend to get lost from time to time.

Technically each EV driver may be identified with a unique identifier, and when the EV driver shows the RFID-card or uses their mobile phone to start charging, the charging station sends this unique identifier to a charging station management system for authorization.

During the authorization process the charging station asks from the management system that is it ok for a certain identifier to start charging on the charging station. The management system then checks that to which (if any) EV driver the identifier belongs to and approves or rejects the charge attempt.

On home charging stations, which may be used just by a single EV driver, it is common to use a technology called plug & charge (not to be confused with ISO15118 Plug &

Charge, which is a different technology for authorization between an EV and a charging station via a charging cable of the EV).

With the plug & charge, the EV driver may not need to use the RFID card/tag or the mobile application for authorization, but the there is a fixed identifier (also called idTag) configured to the charging station (e.g. Plug & Charge ID=ABC123). When the EV driver connects a charging cable to the charging station, the charging station may automatically send an authorization request to the CSMS with the fixed identifier. The request may comprise, for example, "Authorize, idTag=ABC123", depending on the used protocol. The EV driver may not need to use a RFID-card or a mobile application in the authorization. The CSMS then needs to approve this authorization, which it does in the same way as it would process any identifier (like starts done with the RFID or the mobile application). The CSMS system may have the same identifier configured to an EV driver account, e.g., an EV driver named John Doe may be associated to the idTag=ABC123. If the CSMS approves the request, charging starts automatically without the EV driver having to use the RFID-card or mobile application. For example, the CSMS may find the idTag (ABC123) from the driver account of John Doe and accept the authorize-message.

In order for the Plug & Charge to work, the same configuration may be needed to two different places: the charging station needs to have a fixed identifier, such as the idTag, and a Plug & Charge configuration enabled, and the CSMS needs to have the same identifier linked to an authorized party, such as to the EV driver account.

One solution to configure the identifier to the two different places (the charging station and the CSMS) is to have some kind of setting in the mobile application, which requires the EV driver to log in to an application provided by the CSMS operator. In the application there may be a setting "enable Plug & Charge". When the EV driver then enables this setting, the CSMS adds a new identifier to the CSMS configuration, sends the same identifier to the charging station's configuration, and enables Plug & Charge on the charging station.

This approach may not provide the best customer experience. The main issue is that the EV drivers usually have a lot of different applications in their mobile phones. They may have one application from the charging station manufacturer, one application from CSMS operator, and different applications may have different settings. The EV drivers may not even know that there is such a thing as the Plug & Charge function. In addition, they may have no idea from which application and from which setting to search for it. Especially for non-technically savvy people finding the right setting from the right application is not an easy or an optimal solution.

In general, the Plug & Charge may refer to an automatic identification and authorization procedure to start charging of an electric vehicle, wherein the only action required by the driver is to plug the charging cable into the EV and/or charging station.

An objective is to get the Plug & Charge-feature enabled and the correct identifier configured to the both places, to the charging station and to the CSMS, in a simpler manner such that required user-interaction may be minimized.

The proposed procedure is to be distinguished from ISO15118, which is a standard for vehicle-to-grid communication, specifying the ways the vehicles communicate with charging devices. The standard also defines preconditions for identification with the cable or via Wi-Fi, enabling the charging device and the backend service to identify the car and its owner when the vehicle is plugged in. In this disclosure, on the other hand, the identification is based on the fixed identifier of respective charging station, and not, for example, based on information obtained from the vehicle such as a charging cable-based identifier.

Charging at a specific charging station, such as at a home charging station, is made possible as easily and automatically as possible using the method described herein so that also non-technically savvy people with little technical knowledge can do it. A user may not even have to know how to install mobile applications or make configurations from the application.

In an embodiment, when a user plugs in an EV to a charging station for the first time, the user may identify themselves using a RFID-card the user has gotten from an CSMS operator to the charging station. After the first-time identification, charging may start normally. However, as a new feature, Plug & Charge is also automatically enabled without any interaction from the user such that the user may not need to do any configurations anywhere. Hence, the next time the user connects the charging cable to the charging station, Plug & Charge is already working, and no RFID-card or mobile application may be needed anymore for authorization after the first charge.

FIG. 1 illustrates from a user point of view a process to configure and enable Plug & Charge at a charging station 102 according to an example embodiment.

In general, charging stations designed for home use may have a factory configuration, wherein the Plug & Charge feature is set to enabled. The factory configuration may further comprise an identifier, which is unique for each charging station.

When a user 104, such as EV driver, plugs in the EV 103 to the charging station 102 for the first time, the charging station 102 may send a message to a CSMS 101 for authorization based on the identifier. Because the factory-set identifier of the charging station 102 is not linked to any EV driver account, the CSMS 101 rejects the authorization and charging does not start. The EV driver account may refer to any account associated to an authorized party. The EV driver account may comprise, for example, user information, such as a name and payment or billing details.

Thereafter, the EV driver may show their RFID-card 105, which is linked to the EV driver account, to the charging station 102. The charging station 102 may then send a new message for authorization to the CSMS 101, wherein the message now comprises an identity determined based on the RFID-card 105 of the user 104. Now the CSMS 101 can accept the authorize-message and charging may start at the respective charging station.

After the authorization, the CSMS 101 may check if any authorize-message was rejected with a factory-set identifier within a predetermined interval. If such rejected authorize-message is found, the CSMS 101 links the rejected factory-set identifier to the same EV driver account where the accepted identifier belongs to.

Next time the EV driver connects the charging cable, the charging station 102 again sends the authorization-message comprising the factory-set identifier of the respective charging station 102. Now the identifier is found from the EV driver account, and the CSMS 101 can accept the authorize-message. Hence, charging starts automatically without a need to use RFID.

Instead of the RFID-card 105, a mobile application may be used to authorize the user 104. The user 104 may initiate the authorization with the mobile application from a mobile device 106, such as a mobile phone of the user 104. Hence, enabling the Plug & Charge feature may be provided without a need to some setting which may be complex or hard to find in the mobile application. The configuration works similarly as with the RFID-card 105 but instead of showing the RFID-card 105, the user 104 may be logged in to a mobile application provided by the CSMS 101 and starts charging from the mobile application. After the initial charge event, the mobile application is not needed anymore to start charging as the plug & charge is configured and enabled.

In an embodiment, the CSMS 101 may be configured to display a notification via the mobile application to the user 104 that the Plug & Charge is enabled. Hence, the user 104 is aware that the next time they connect their vehicle to the charging station, charging may start automatically without any further action required from the user 104.

Figure 2:
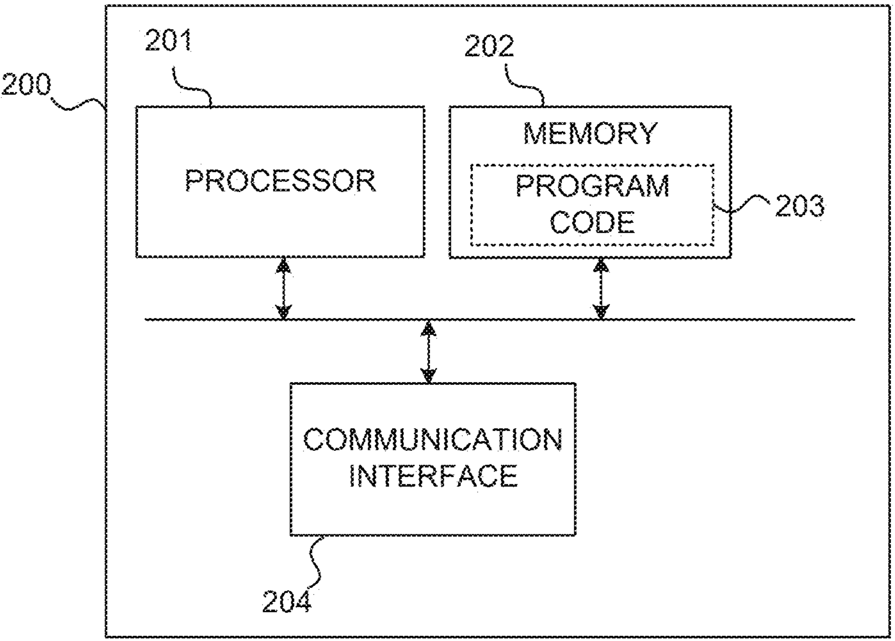
FIG. 2 illustrates an example of a computing device configured to practice one or more example embodiments.

FIG. 2 illustrates an example of a computing device 200 configured to practice one or more example embodiments. The computing device 200 may comprise for example a server device, a client device, a mobile phone, a tablet computer, a laptop, or the like. Although the computing device 200 is illustrated as a single device it is appreciated that, wherever applicable, functions of the computing device 200 may be distributed to a plurality of devices. In an embodiment, the charging station management system 101 may comprise the computing device 200.

The computing device 200 may comprise at least one processor 201. The at least one processor 201 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The computing device 200 may further comprise at least one memory 202. The memory 202 may be configured to store, for example, computer program code 203 or the like, for example operating system software and application software. The memory 202 may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The computing device 200 may further comprise a communication interface 204 configured to enable the computing device 200 to transmit and/or receive information, to/from other devices. The communication interface 204 may be configured to provide at least one wireless radio connection, such as for example a 3GPP mobile broadband connection (e.g. 3G, 4G, 5G). However, the communication interface 204 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 204 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

When the computing device 200 is configured to implement some functionality, some component and/or components of the computing device 200, such as for example the at least one processor 201 and/or the memory 202, may be configured to implement this functionality. Furthermore, when the at least one processor 201 is configured to implement some functionality, this functionality may be implemented using program code 203 comprised, for example, in the memory 202.

The functionality described herein may be performed, at least in part, by one or more computer program product components such as software components. According to an embodiment, the computing device 200 comprises a processor 201 or processor circuitry, such as for example a microcontroller, configured by the program code 203 when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUS).

The computing device 200 comprises means for performing at least one method described herein. In one example, the means comprises the at least one processor 201, the at least one memory 202 including program code 203 configured to, when executed by the at least one processor 201, cause the computing device 200 to perform the method.

Figure 3:
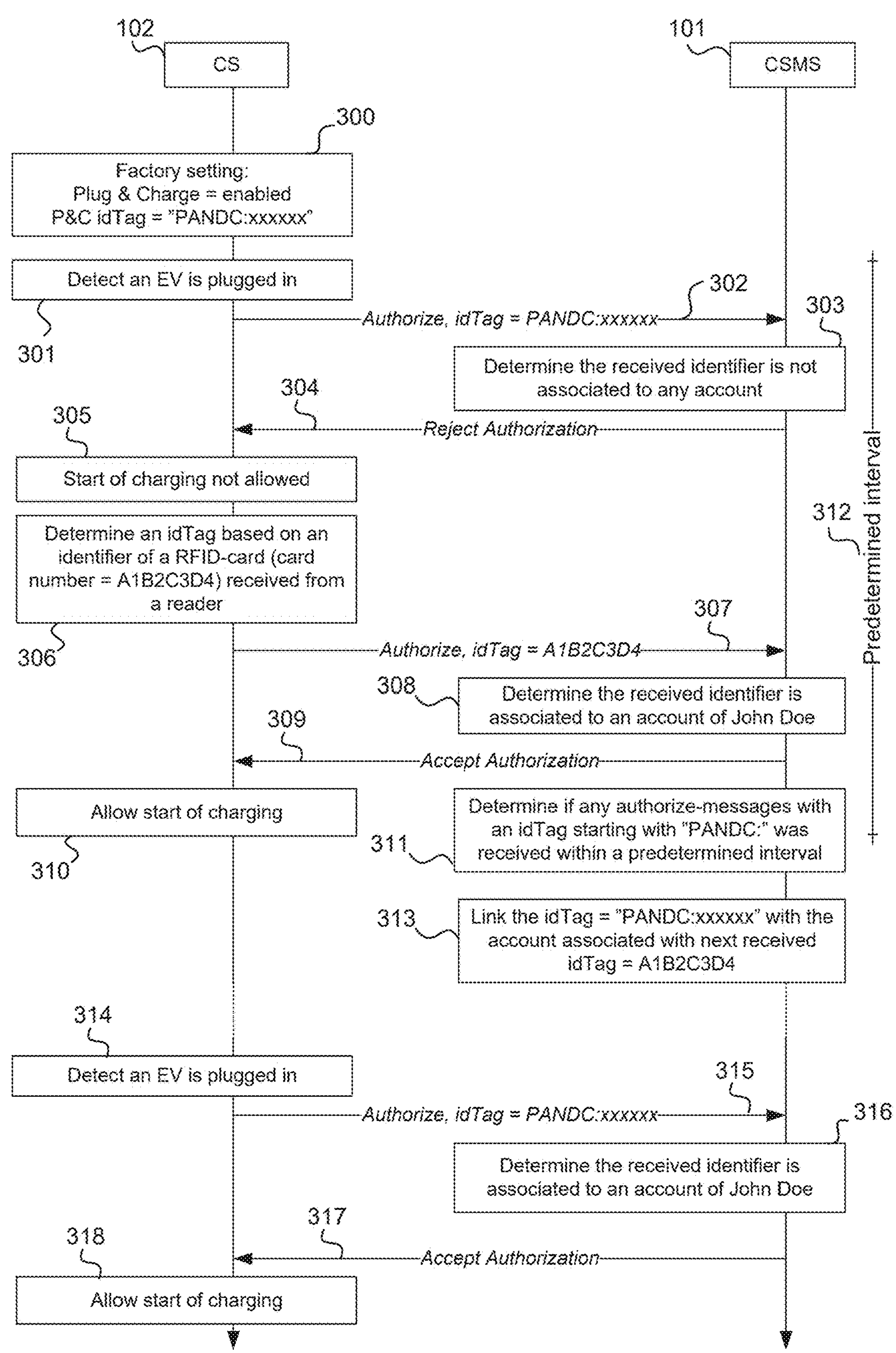
FIG. 3 illustrates a message sequence chart between a charging station and a charging station management system to enable plug & charge at the charging station according to an example embodiment.

FIG. 3 illustrates a message sequence chart between a charging station 102 and a charging station management system 101 to enable plug & charge at the charging station 102 according to an example embodiment.

At 300, the charging station 102 is configured to have a unique identifier. Further, the charging station 102 may be configured to enable the Plug & Charge. When the Plug & Charge is enabled at the charging station, the charging station may be configured to send an authorize-message to the CSMS comprising the unique identifier when the charging station detects that a charging cable of an EV is connected to the charging station. The configuration may be set at a factory.

The configuration may comprise an identifier for the Plug & Charge feature, for example, "P & C idTag='PANDC: xxxxxx'", where xxxxx is the unique identifier for each charging station. The unique identifier of the charging station may be accompanied with an affix. In the previous example, the affix is represented by a prefix "PANDC:". The affix may comprise, for example, one or more letters, numbers, or a combination of letters and numbers. The affix may be used as an indicator that a message comprises an identifier for the plug & charge based authorization.

At 301, the charging station 102 may be configured to detect that an EV is plugged in to the charging station 102.

At 302, the charging station 102 may be configured to send a message to the CSMS. The message may be an OCPP message. The message may comprise, for example, a request for authorization based on the identifier of the charging station 102 (e.g., "Authorize, idTag=PANDC:xxxxxx"). The CSMS 101 then receives the message, and if the CSMS 101 determines at 303 that the identifier (idTag=PANDC: xxxxxx) is not linked to any EV driver account, the CSMS 101 rejects the authorization at 304. Hence, at 305, charging does not start at the charging station 102.

Thereafter, at 306, the EV driver may show their RFID-card, which is linked to a respective EV driver account, to a RFID-reader of the charging station 102. The charging station 102 may then send, at 307, a new authorize-message with another identifier (e.g., idTag=A1B2C3D4, where A1B2C3D4 is the RFID-card's number) to the CSMS 101. At 308, the CSMS 101 may be configured to determine that the received identifier is associated to an EV driver account (for example, the RFID-card is owned by John Doe and the RFID-based identifier is linked to the account of a user named John Doe at the CSMS 101). At 309, the CSMS 101 system may accept the authorize-message. In response, at 310, charging may start at the respective charging station 102.

After the authorization, at 311, the CSMS 101 may check if any authorize-message was rejected with an identifier that starts with a specific indicator such as the "PANDC:" within a predetermined interval 312. The predetermined interval 312 may have any value between 10 seconds and 10 minutes. For example, the CSMS 101 may check if any authorization was rejected during the last 30 seconds, 60 seconds, 90 seconds, 2 minutes, or minutes. If such rejected authorize-message is found (such as at 304), the CSMS 101 may be configured to link the idTag=PANDC:xxxxxx (received at 302) to the same EV driver account where the accepted idTag A1B2C3D4 (received at 307) belongs to at operation 313.

The next time the EV driver connects the charging cable (at 314), the charging station 102 again sends the authorization-message, such as the "Authorize, idTag=PANDC: xxxxxx", comprising the indicator and the identifier of the charging station 102 at 315. Now, at 316, the CSMS 101 may be configured to determine that the idTag=PANDC: xxxxxx is found from an EV driver account (e.g., the account of John Doe). Consequently, at 317, the CSMS 101 is configured to accept the authorize-message received at 315. Hence, at 318, the charging station receives the acceptance and charging may start automatically without a need to use the RFID.

Instead of using the RFID-card at 306, the identifier associated to the user may be received, for example, via a mobile application or a user-interface of the charging station. When the mobile application is used, the identifier of the charging station may be linked to the same EV Driver account that was logged in to the mobile application. In an embodiment, the charging station 102 may comprise means for receiving the identifier of the user manually inputted by the user. The identifier of the charging station may be then linked to the EV driver account linked to the identifier inputted by the user.

In an embodiment, the mobile application may request from the user after operation 311 if they want to enable plug & charge function. If the user used the RFID-card for identification, the request may be shown to the user next time they open the mobile application. In an embodiment, the CSMS 101 may be configured to proceed to operation 313 after an approval is received from the user via the mobile application. The benefit is to provide a bit more control for the setting, while keeping it simple and not requiring the EV driver to find the setting for configuring Plug & Charge somewhere in the mobile application.

In an embodiment, the charging station may be pre-configured on the factory. Hence, when the charging station is shipped to for deployment, it may already include correct configuration (e.g. Plug & Charge=enabled, idTag=PANDC: xxxxxx). However, many charging stations may be shipped with a default configuration where Plug & charge is disabled.

Figure 4:
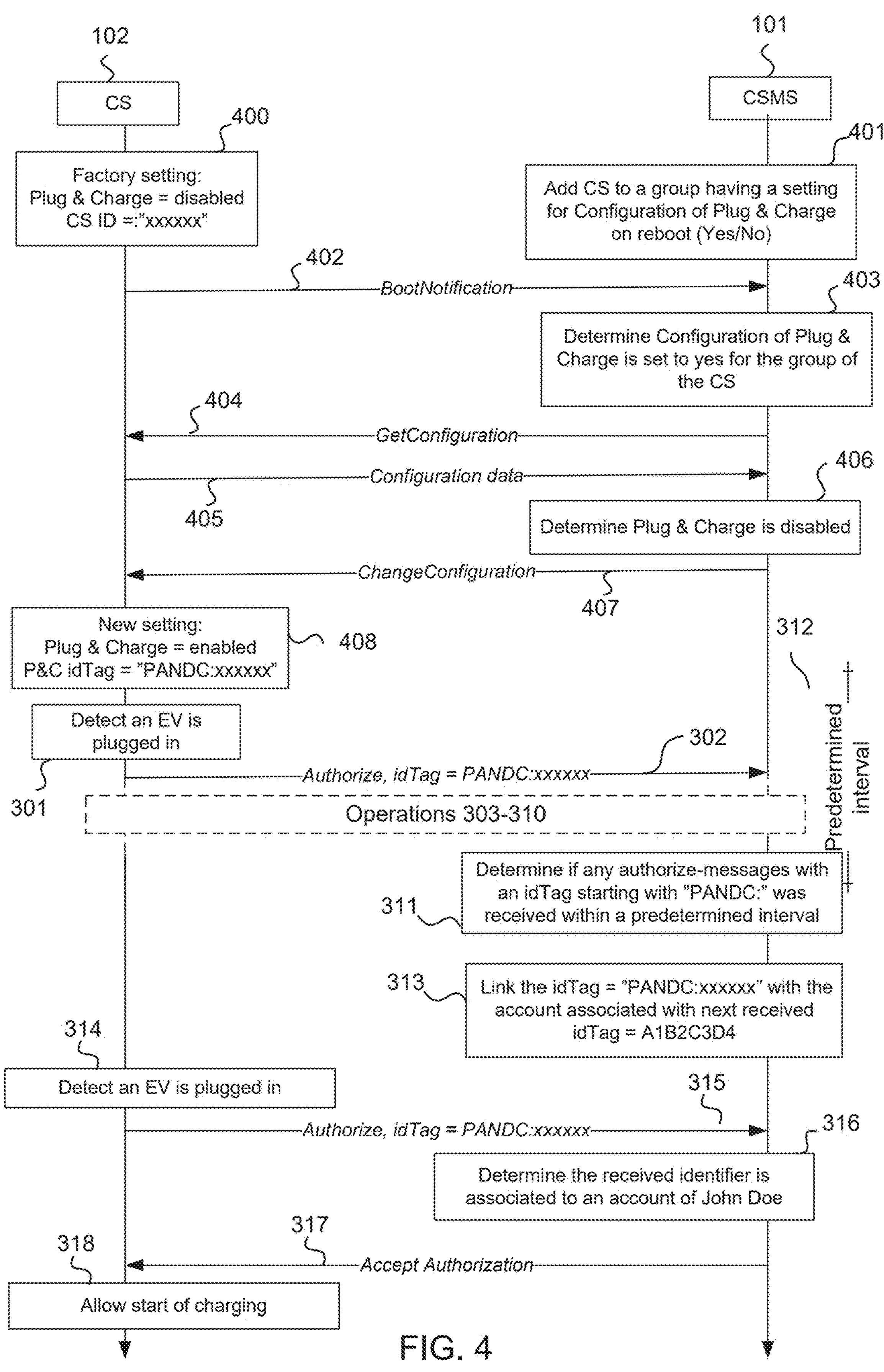
FIG. 4 illustrates a message sequence chart between a charging station and a charging station management system for automatic configuration of the charging station according to an example embodiment.

FIG. 4 illustrates a message sequence chart between a charging station and a charging station management system for automatic configuration of the charging station according to an example embodiment. In an embodiment, the charging station management system may be configured to automatically configure the charging station upon reboot such that no factory commissioning or manual configurations are needed to enable the automatic authorizations to start charging an plugged-in electric vehicle at the respective charging station.

At 400, the charging station 102 may be configured at the factory such that the Plug & Charge function is disabled. That is, the charging station is not configured to automatically send an authorize message in response to a detected connection of an EV. The charging station may not either comprise an identifier associated with an indicator of the plug & charge function.

At 401, the CSMS 101 may be configured to form one or more groups of one or more charging stations. The charging station 102 may be add to a group, such as a group of home charging stations. Each group may have a setting for configuration of Plug & Charge on reboot, wherein the configuration is either set to be allowed (Yes) or not allowed (No).

At 402, the CSMS 101 may receive a BootNotification-message upon reboot/start-up of the charging station 102. Upon reception of the message, at 403, the CSMS 101 may be configured to determine what is the setting for configuration of Plug & Charge on reboot for the group the charging station belongs to.

If the configuration is allowed, at 404, the CSMS 101 may be configured to send a message (such as OCPP GetConfiguration) to the charging station 102 to obtain its current configuration for the Plug & Charge. At 405, the charging station 102 responds with its configuration information. Based on the received configuration information, at 406, the CSMS 101 may determine that Plug & Charge is disabled at the charging station 102. In response, at 407, the CSMS 101 may be configured to send a message (e.g., OCPP ChangeConfiguration) to the charging station 102 to change the configuration with Plug & Charge=enabled, idTag=PANDC:xx xxx, wherein xxxxxx is the identifier of the charging station 102.

After the new configuration at 408, comprising the enabled and correct settings for Plug & Charge, the charging station 102 may detect that an electric vehicle is plugged in, at 301. The charging station 102 is now configured to send an authorization message comprising the identifier for Plug & Charge, at 302. Thereafter, the CSMS 101 and charging station 102 may be configured to perform the configuration and verification steps 303-318 of FIG. 3. Hence, the description of the operations is not repeated herein.

Figure 5:
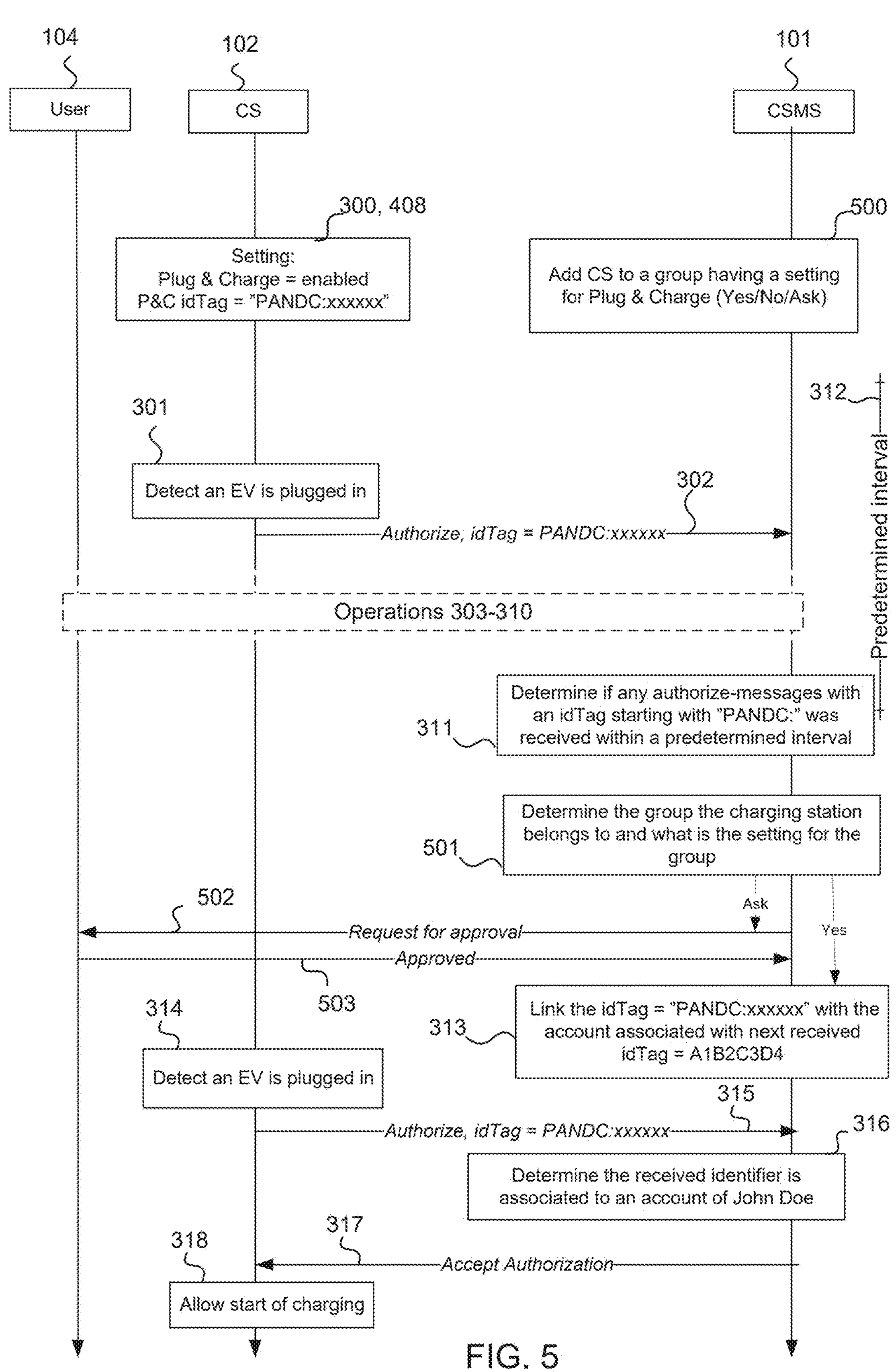
FIG. 5 illustrates a message sequence chart between a charging station and a charging station management system for verification of allowed plug & charge operation according to an example embodiment.

FIG. 5 illustrates a message sequence chart between a charging station and a charging station management system for verification of allowed plug & charge operations according to an example embodiment.

At 500, the CSMS 101 may be configured to form one or more groups of charging stations. The CSMS 101 may add the charging station 102 to a group having a setting for Plug & Charge as allowed (yes), not allowed (no), or allowed only after approval from a user (ask). The group may comprise charging stations which are indicated as home charging stations, for example. The group may correspond to the same group of charging stations as in operation 401 in FIG. 4. Hence, a group of charging stations may be configured by the CSMS 101 for both the verification of allowance to perform Plug & Charge operations as well as configuration of the Plug & Charge settings on reboot.

The charging station 102 may comprise settings for the Plug & Charge, which settings may be either factory set (at 300) or configured on reboot (at 408). After the charging station 102 detects that an electric vehicle is plugged in at 301, the system comprising the charging station 102 and the CSMS 101 may perform the operations 302-312 as described in FIG. 3.

After operation 311, the CSMS 101 may be configured to determine at 501 the group in which the charging station 102 belongs to, and what is the setting of the group for Plug & Charge.

If the setting is no, Plug & Charge is not enabled for the respective EV driver at the charging station 102. If the setting is yes, the CSMS 101 is configured to proceed to operation 313 and link the identifier of the charging station 102 with a user account associated to the identifier received at 307. If the setting requires first asking from the user, the CSMS 101 is configured to send a request for approval to the user 104 at 502. The user 104 may receive the request, for example, via an application running on their mobile phone and respond to the CSMS 101 at 503 with an approval. After the approval is received by the CSMS 101, the CSMS 101 may be configured to proceed to the operation 313. Thereafter, at 314-318, any subsequent requests for authorization in response to a plugged in electric vehicle at the charging station 102 may be automatically verified by the CMSM 101 as already described in FIG. 3.

In the previous examples, the charging station may have been linked to an EV driver account by the CSMS. However, when a new charging station comes from a factory with default settings, it may not be linked to any EV driver account, and it may not be known which user owns the charging station. Hence, the CSMS may not know to which user notifications should be sent via the mobile application.

In an embodiment, a charging station may be linked to an EV driver account at an initial charge at the charging station based on an identifier received via at least one of an RFID-card or a mobile application. The charging station may be added to a group, such as a group of home charging stations with factory settings, by the CSMS. The user may identify oneself at the charging station at the initial charge to start charging using, for example, their RFID-card. The charging may thus start normally after authorization is performed based on the RFID-card. The CSMS may be configured to send a notification to the user via a mobile application running on a mobile device of the user. The right receiver of the notification may be determined by the CSMS based on the identifier received for the authorization.

The notification may be configured to start a dialogue with the user where the user is asked if the charging station is their home charging station, what is POI (point-of-interest) data related to the charging station (such as its location on a map), and/or whether the user wants to enable the Plug & Charge function. If the user acknowledges that the charging station is their home charging station, the CSMS may be configured to remove the respective charging station from the group to avoid further group-specific configurations (e.g., the setting for allowing Plug & Charge or configuration for Plug & Charge on reboot described in FIGS. 4 and 5). Further, the mobile application may display a map view to the user where the user can point corrects coordinates of the charging station. In addition, the user may add different POI data for the charging station, such as a name, a photo or other data. If the user selects to enable the Plug & Charge, the CSMS may configure the charging station for automatic authorization when an EV is plugged in at the charging station as described earlier in FIG. 3, by linking the identifier of the charging station with the EV user account associated with the identifier of the user.

Figure 6:
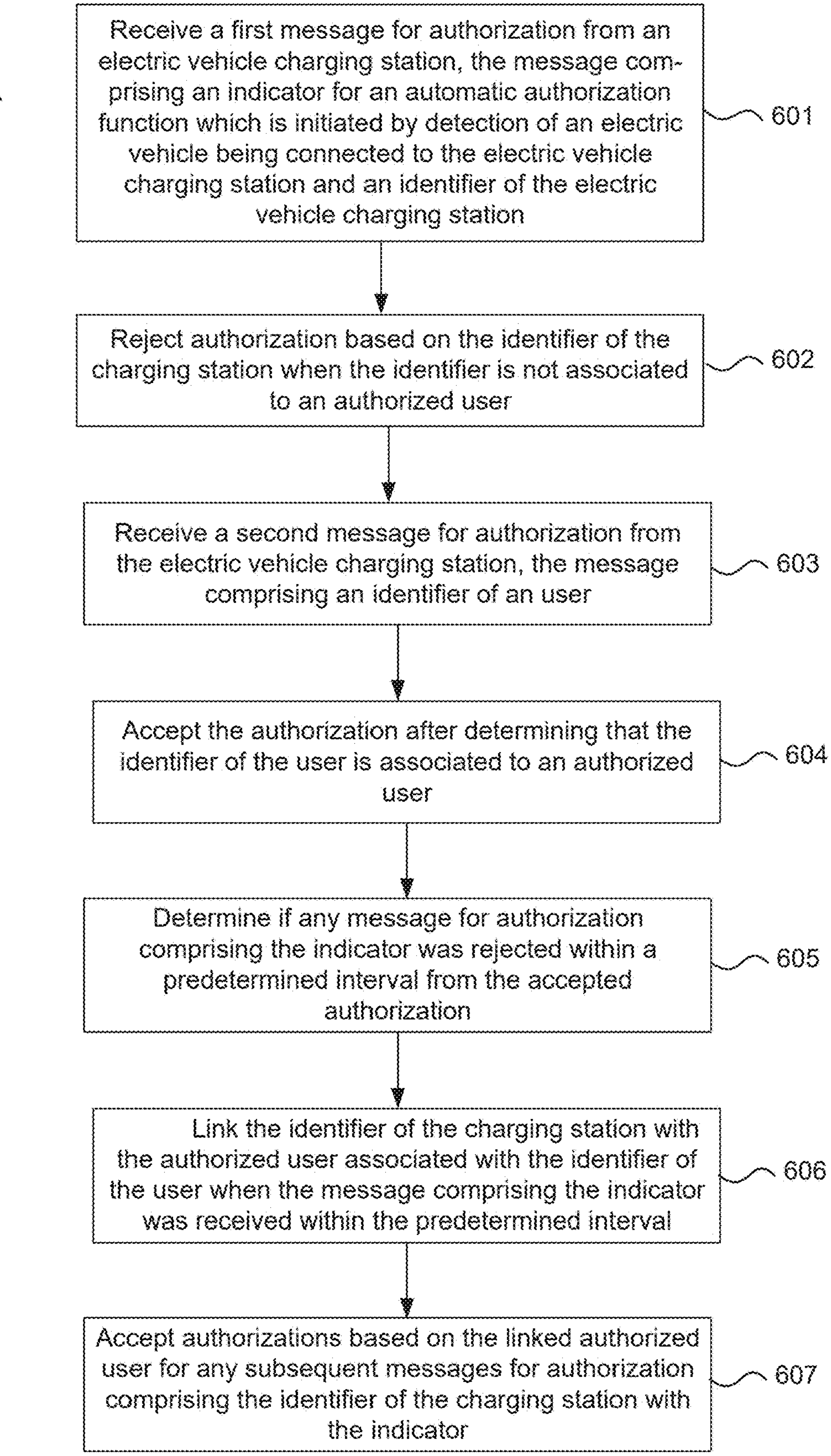
FIG. 6 illustrates a flow chart to configure a charging station to enable plug & charge operation according to an example embodiment.

FIG. 6 illustrates a flow chart of a method 400 to configure a charging station to enable plug & charge operation according to an example embodiment.

At 601, the method may comprise receiving a first message for authorization from an electric vehicle charging station, the message comprising an indicator for an automatic authorization function which is initiated by detection of an electric vehicle being connected to the electric vehicle charging station and an identifier of the electric vehicle charging station.

At 602, the method may comprise rejecting authorization based on the identifier of the charging station when the identifier is not associated to an authorized user.

At 603, the method may comprise receiving a second message for authorization from the electric vehicle charging station, the message comprising an identifier of an user.

At 604, the method may comprise accepting the authorization after determining that the identifier of the user is associated to an authorized user.

At 605, the method may comprise determining if any message for authorization comprising the indicator was rejected within a predetermined interval from the accepted authorization.

At 606, the method may comprise linking the identifier of the charging station with the authorized user associated with the identifier of the user when the message comprising the indicator was received within the predetermined interval.

At 607, the method may comprise accepting authorizations based on the linked authorized user for any subsequent messages for authorization comprising the identifier of the charging station with the indicator.

It is obvious to a person skilled in the art that with the advancement of technology, the basic idea of the invention may be implemented in various ways. The invention and its embodiments are thus not limited to the examples described above, instead they may vary within the scope of the claims. Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item, 'at least one' item, and 'one or more' items may refer to one or more of those items or a plurality of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

The invention claimed is:

1. A computer-implemented method, comprising:

receiving, by a charging station management system (CSMS), a first authorization request message from an electric vehicle charging station, the first authorization request message comprising an indicator for an automatic authorization function which is initiated by detection of an electric vehicle being connected to the electric vehicle charging station and an identifier of the electric vehicle charging station;

rejecting, by the CSMS, authorization based on the identifier of the charging station when the charging station identifier is not associated to an authorized user;

receiving, by the CSMS, a second authorization request message from the electric vehicle charging station, the second authorization request message comprising an identifier of a user;

accepting, by the CSMS, the authorization after determining that the identifier of the user is associated to the authorized user;

determining, by the CSMS, that the first authorization request message comprising the indicator was rejected within a predetermined interval from the accepted authorization;

linking, by the CSMS, the identifier of the charging station with the authorized user associated with the identifier of the user when the first authorization request message comprising the indicator was received within the predetermined interval; and accepting, by the CSMS, authorizations based on the linked authorized user automatically for any subsequent authorization request messages comprising the identifier of the charging station with the indicator received from the charging station.

2. The computer-implemented method of claim 1, wherein the predetermined interval has a value between ten seconds and ten minutes.

3. The computer-implemented method of claim 1, further comprising:

sending a request to determine if the user wants to enable the automatic authorization function at the electric vehicle charging station in response to a connected electric vehicle being detected; and linking the identifier of the charging station with the authorized user after receiving an approval from the user.

4. The computer-implemented method of claim 1, comprising:

determining a group of charging stations the electric vehicle charging station belongs to;

determining if the automatic authorization is allowed for the charging stations of the group; and linking the identifier of the charging station with the authorized user if the automatic authorization is allowed for the group.

5. The computer-implemented method of claim 4, comprising:

sending a request to determine if the user wants to enable the automatic authorization function at the electric vehicle charging station in response to a connected electric vehicle being detected, wherein the request is sent to the user in response to determining that the automatic authorization is allowed for the group only after an approval is received from the user; and linking the identifier of the charging station with the authorized user after receiving an approval from the user.

6. The computer-implemented method of claim 4, further comprising:

receiving a start-up notification from the electric vehicle charging station;

requesting configuration settings of the electric vehicle charging station in response to the start-up notification;

determining if the automatic authorization function comprising a use of the identity of the electric vehicle charging station with the indicator are set to enabled based on the configuration settings;

determining if the automatic authorization for the group is allowed to be enabled at start-up when automatic authorization is disabled; and sending a configuration message to the electric vehicle charging station to enable the automatic authorization function and setting the identifier of the charging station with the indicator to be used when the automatic authorization is allowed.

7. The computer-implemented method of claim 4, further comprising:

sending a request to the user to determine if the electric vehicle charging station is a personal electric vehicle charging station of the user; and upon receiving a verification from the user, removing the electric vehicle charging station from the group.

8. A non-transitory computer-readable medium comprising program instructions which, when executed on a computing device, cause the computing device to perform the method of claim 1.

9. A charging station management system (CSMS), the CSMS comprising at least one processor and at least one memory, the at least one memory including program code configured to, when executed by the at least one processor, cause the CSMS to:

receive a first authorization request message from an electric vehicle charging station, the first authorization request message comprising an indicator for an automatic authorization function which is initiated by detection of an electric vehicle being connected to the electric vehicle charging station and an identifier of the electric vehicle charging station;

reject authorization based on the identifier of the charging station when the charging station identifier is not associated to an authorized user;

receive a second authorization request message from the electric vehicle charging station, the second authorization request message comprising an identifier of an user;

accept the authorization after determining that the identifier of the user is associated to the authorized user;

determine if the first authorization request message comprising the indicator was rejected within a predetermined interval from the accepted authorization;

link the identifier of the charging station with the authorized user associated with the identifier of the user when the first authorization request message comprising the indicator was received within the predetermined interval; and accept authorizations based on the linked authorized user automatically for any subsequent authorization request messages comprising the identifier of the charging station with the indicator received from the charging station.

10. The CSMS of claim 9, wherein the at least one memory including program code is further configured to, when executed by the at least one processor, cause the CSMS to:

send a request to determine if the user wants to enable the automatic authorization function at the electric vehicle charging station in response to a connected electric vehicle being detected; and link the identifier of the charging station with the authorized user after receiving an approval from the user.

11. The CSMS of claim 9, wherein the at least one memory including program code is further configured to, when executed by the at least one processor, cause the computing device to:

determine a group of charging stations the electric vehicle charging station belongs to;

determine if the automatic authorization is allowed for the charging stations of the group; and link the identifier of the charging station with the authorized user if the automatic authorization is allowed for the group.

12. The CSMS of claim 11, further configured to:

send a request to determine if the user wants to enable the automatic authorization function at the electric vehicle charging station in response to a connected electric vehicle being detected, wherein the request is sent to the user when determined that the automatic authorization is allowed for the group only after an approval is received from the user; and link the identifier of the charging station with the authorized user after receiving an approval from the user.

13. The CSMS claim 11, wherein the at least one memory including program code is further configured to, when executed by the at least one processor, cause the computing device to:

receive a start-up notification from the electric vehicle charging station;

requesting configuration settings of the electric vehicle charging station in response to the start-up notification;

determine if the automatic authorization function comprising a use of the identity of the electric vehicle charging station with the indicator are set to enabled based on the configuration settings;

determine if the automatic authorization for the group is allowed to be enabled at start-up when automatic authorization is disabled; and send a configuration message to the electric vehicle charging station to enable the automatic authorization function and setting the identifier of the charging station with the indicator to be used when the automatic authorization is allowed.

14. The CSMS of claim 11, wherein the at least one memory including program code is further configured to, when executed by the at least one processor, cause the computing device to:

send a request to the user to determine if the electric vehicle charging station is a personal electric vehicle charging station of the user; and upon reception of a verification from the user, remove the electric vehicle charging station from the group.

* * * * *